US012560002B2

(12) United States Patent
Wilke et al.

(10) Patent No.: US 12,560,002 B2
(45) Date of Patent: Feb. 24, 2026

(54) DEVICE FOR ALIGNING COVERS FOR VEHICLES

(71) Applicant: Illinois Tool Works Inc., Glenview, IL (US)

(72) Inventors: Zsolt Wilke, Bad Mergentheim (DE); Andreas Rudolf, Eibelstadt (DE); Joachim Oberst, Großrinderfeld (DE)

(73) Assignee: Illinois Tool Works Inc., Glenview, IL (US)

( * ) Notice: Subject to any disclaimer, the term of this patent is extended or adjusted under 35 U.S.C. 154(b) by 140 days.

(21) Appl. No.: 18/130,753

(22) Filed: Apr. 4, 2023

(65) Prior Publication Data

US 2023/0340811 A1 Oct. 26, 2023

(30) Foreign Application Priority Data

Apr. 26, 2022 (DE) ........................ 102022110 011.1

(51) Int. Cl.
*E05B 85/10* (2014.01)

(52) U.S. Cl.
CPC .................................. *E05B 85/103* (2013.01)

(58) Field of Classification Search
CPC ...... E05B 85/103; E05B 85/02; E05B 85/107; E05B 85/14; E05B 85/16; E05B 85/18; E05B 79/06; Y10T 292/57
See application file for complete search history.

(56) References Cited

U.S. PATENT DOCUMENTS 4,867,501 A 9/1989 Nomura
6,923,481 B2 * 8/2005 Bruderick ............... E05B 81/76 292/DIG. 31
7,062,945 B2 6/2006 Saitoh
7,404,588 B2 * 7/2008 Gabsch ............... B60R 13/0206 296/146.7
7,621,573 B2 11/2009 Thomas
8,089,228 B2 1/2012 Ballard
8,443,553 B1 5/2013 Polewarczyk
9,062,478 B2 * 6/2015 Bingle .................. E05B 85/107
9,156,335 B1 10/2015 Harter
(Continued)

FOREIGN PATENT DOCUMENTS

CN 108843162 A * 11/2018 ............. E05B 79/22
CN 108979368 A * 12/2018 ............. E05B 77/06
(Continued)

*Primary Examiner* — Steven A Tullia
(74) *Attorney, Agent, or Firm* — McAndrews, Held & Malloy, Ltd.

(57) ABSTRACT

The present disclosure relates to an apparatus (100) for aligning covers (102) for vehicles, in particular covers for flush door handles, wherein the cover (102) is reversibly movable, and in particular pivotable, between a closed position in which the cover (102) covers a door handle recess (106) and an open position in which the cover releases a door handle recess (106), and wherein the apparatus (100) comprises the following: a kinematics (108) configured so as to reversibly move, and in particular pivot, the cover (102) between the closed position and the open position; and a support assembly (200) configured so as to connect the cover (102) to the kinematics (108) in such a way that the cover (102), in its closed position, is arranged flush with an outer skin (104) of the vehicle.

19 Claims, 9 Drawing Sheets

(56) References Cited

U.S. PATENT DOCUMENTS

| | | | | |
|---|---|---|---|---|
| D806,513 | S | 1/2018 | Curic | |
| 10,052,947 | B2 | 8/2018 | Herrmann | |
| 10,053,893 | B1 * | 8/2018 | Patel | E05B 85/10 |
| 10,253,533 | B1 * | 4/2019 | Pudney | E05F 1/1016 |
| 10,577,845 | B2 | 3/2020 | Herczeg | |
| 10,615,534 | B2 | 4/2020 | Herczeg | |
| 10,655,371 | B2 * | 5/2020 | Soonthornwinate | E05B 79/06 |
| 10,711,494 | B2 | 7/2020 | Bingle | |
| 10,934,748 | B2 | 3/2021 | Harajli | |
| 10,941,603 | B2 | 3/2021 | Linden | |
| 10,988,962 | B2 * | 4/2021 | Park | E05B 85/103 |
| 11,027,646 | B2 | 6/2021 | Kothe | |
| 11,085,212 | B2 | 8/2021 | Rivaya | |
| 11,479,995 | B2 * | 10/2022 | Löw | E05B 79/06 |
| 11,821,245 | B2 * | 11/2023 | Herdering | E05B 81/76 |
| 2004/0177478 | A1 * | 9/2004 | Louvel | E05B 79/06 16/430 |
| 2005/0121924 | A1 * | 6/2005 | Chanya | E05B 85/107 292/336.3 |
| 2006/0279095 | A1 * | 12/2006 | Ishiguro | E05B 81/76 292/336.3 |
| 2008/0163555 | A1 * | 7/2008 | Thomas | E05B 85/01 292/336.3 |
| 2009/0058132 | A1 * | 3/2009 | Browne | B60J 5/0415 296/181.7 |
| 2013/0079984 | A1 | 3/2013 | Aerts | |
| 2013/0127185 | A1 | 5/2013 | Lang | |
| 2014/0000167 | A1 | 1/2014 | Patel | |
| 2014/0047877 | A1 * | 2/2014 | Bohm | E05B 81/16 70/357 |
| 2014/0300115 | A1 * | 10/2014 | Vasi | E05B 85/103 292/336.3 |
| 2015/0315812 | A1 * | 11/2015 | Vasi | E05B 81/08 292/336.3 |
| 2016/0010369 | A1 * | 1/2016 | Specht | E05B 81/00 292/336.3 |
| 2016/0208523 | A1 * | 7/2016 | Bingle | E05B 85/10 |
| 2017/0066312 | A1 * | 3/2017 | Coutier | E05B 85/10 |
| 2019/0078360 | A1 * | 3/2019 | Blount | E05B 85/103 |
| 2019/0100948 | A1 * | 4/2019 | Low | H05K 5/023 |
| 2019/0234121 | A1 * | 8/2019 | Pudney | E05B 85/103 |
| 2019/0368239 | A1 | 12/2019 | Rhein | |
| 2020/0308883 | A1 | 10/2020 | Bresser | |
| 2020/0332575 | A1 | 10/2020 | Christensen | |
| 2020/0362604 | A1 | 11/2020 | Jarnicki | |
| 2021/0062558 | A1 | 3/2021 | Beck | |
| 2021/0332619 | A1 * | 10/2021 | Peterson | B60R 25/2045 |
| 2022/0042356 | A1 | 2/2022 | Herdering | |
| 2022/0243506 | A1 * | 8/2022 | Moriyama | B60J 5/0468 |
| 2022/0268063 | A1 | 8/2022 | Vrsecký | |
| 2022/0282533 | A1 | 9/2022 | Schütz | |
| 2023/0258029 | A1 * | 8/2023 | Philippe | E05B 85/103 70/277 |
| 2023/0349219 | A1 * | 11/2023 | Zhao | B60L 53/16 |
| 2024/0093537 | A1 | 3/2024 | Wilke | |
| 2024/0125154 | A1 * | 4/2024 | Peterson | E05B 1/0084 |
| 2024/0418018 | A1 * | 12/2024 | Zhou | E05B 85/18 |

FOREIGN PATENT DOCUMENTS

| | | | | | |
|---|---|---|---|---|---|
| CN | 109477347 | A | * | 3/2019 | E05B 81/76 |
| CN | 209723950 | U | * | 12/2019 | E05B 85/00 |
| CN | 210732313 | U | * | 6/2020 | B25B 27/00 |
| CN | 211549234 | U | | 9/2020 | |
| CN | 112443217 | A | * | 3/2021 | E05B 79/06 |
| CN | 113090142 | A | | 7/2021 | |
| CN | 115538871 | A | * | 12/2022 | E05B 85/103 |
| DE | 19642687 | A1 | | 4/1998 | |
| DE | 19919251 | A1 | | 11/2000 | |
| DE | 10249703 | A1 | * | 5/2004 | E05B 85/107 |
| DE | 19740827 | B4 | * | 6/2006 | E05B 77/34 |
| DE | 102008019335 | A1 | * | 10/2008 | E05B 85/107 |
| DE | 102011017240 | A1 | * | 12/2011 | B60R 11/04 |
| DE | 102010053137 | A1 | | 6/2012 | |
| DE | 10128866 | B4 | * | 8/2012 | E05B 17/183 |
| DE | 102013212083 | A1 | | 1/2014 | |
| DE | 102012020710 | A1 | | 4/2014 | |
| DE | 202014101216 | U1 | | 5/2015 | |
| DE | 102014103642 | A1 | | 8/2015 | |
| DE | 102014109738 | A1 | | 12/2015 | |
| DE | 102016112423 | A1 | | 1/2017 | |
| DE | 202017104635 | U1 | | 10/2017 | |
| DE | 102016109933 | A1 | | 11/2017 | |
| DE | 102016110869 | A1 | | 12/2017 | |
| DE | 102017008108 | A1 | | 1/2018 | |
| DE | 102017101247 | A1 | | 7/2018 | |
| DE | 102017212397 | A1 | | 1/2019 | |
| DE | 202019103205 | U1 | | 7/2019 | |
| DE | 102018109474 | A1 | | 10/2019 | |
| DE | 102017124368 | B4 | | 3/2020 | |
| DE | 102018128972 | A1 | | 5/2020 | |
| DE | 102019106436 | A1 | | 9/2020 | |
| DE | 102019206282 | A1 | | 11/2020 | |
| DE | 202021001685 | U1 | | 6/2021 | |
| DE | 102020106168 | A1 | | 9/2021 | |
| DE | 102020117046 | B3 | * | 9/2021 | E05B 81/06 |
| DE | 102020113492 | A1 | | 11/2021 | |
| DE | 102020209655 | A1 | | 2/2022 | |
| DE | 102020130235 | A1 | | 5/2022 | |
| DE | 102022105502 | A1 | | 9/2022 | |
| DE | 102021002425 | A1 | | 11/2022 | |
| DE | 202022104963 | U1 | | 12/2022 | |
| DE | 102017126077 | B4 | * | 1/2023 | B60R 21/01 |
| DE | 102020209607 | A1 | | 12/2023 | |
| DE | 202023104889 | U1 | * | 1/2024 | B60Q 1/2669 |
| DE | 102020209609 | A1 | | 2/2024 | |
| DE | 102023118359 | A1 | | 1/2025 | |
| EP | 0681075 | A2 | * | 11/1995 | E05B 79/06 |
| EP | 1081319 | A1 | * | 3/2001 | E05B 81/78 |
| EP | 1186734 | A1 | * | 3/2002 | E05B 85/18 |
| EP | 1402138 | B1 | | 11/2005 | |
| EP | 1944436 | A2 | | 7/2008 | |
| EP | 2032782 | B1 | | 8/2010 | |
| EP | 2032783 | B1 | | 8/2010 | |
| EP | 2259984 | A1 | | 12/2010 | |
| EP | 2808467 | B1 | | 3/2017 | |
| EP | 2663705 | B1 | | 7/2017 | |
| EP | 3426869 | A1 | | 1/2019 | |
| EP | 2775076 | B1 | | 9/2019 | |
| EP | 2646277 | B1 | | 4/2020 | |
| EP | 3712362 | A1 | * | 9/2020 | E05B 77/06 |
| EP | 3734002 | A1 | | 11/2020 | |
| EP | 3803007 | A1 | | 4/2021 | |
| EP | 3322870 | B1 | | 10/2021 | |
| EP | 3430217 | B1 | | 1/2022 | |
| EP | 3681750 | B1 | | 4/2022 | |
| EP | 4019312 | A1 | | 6/2022 | |
| EP | 4258312 | A2 | | 10/2023 | |
| FR | 3034802 | A1 | * | 10/2016 | E05B 85/103 |
| FR | 3054582 | A1 | * | 2/2018 | E05B 17/0012 |
| FR | 3071861 | A1 | * | 4/2019 | E05B 77/34 |
| FR | 3096713 | A1 | | 12/2020 | |
| JP | S629655 | U | * | 1/1987 | E05B 1/00 |
| JP | 2019027076 | A | | 2/2019 | |
| JP | 2019090196 | A | | 6/2019 | |
| KR | 100931160 | B1 | | 12/2009 | |
| WO | WO-9952727 | A1 | * | 10/1999 | B60J 5/0416 |
| WO | WO-0034604 | A1 | * | 6/2000 | B29C 45/1676 |
| WO | WO-0208550 | A2 | * | 1/2002 | E05B 79/06 |
| WO | WO-0229184 | A1 | * | 4/2002 | E05B 79/06 |
| WO | WO-2011047649 | A1 | * | 4/2011 | E05B 85/107 |
| WO | WO-2012021782 | A2 | * | 2/2012 | E05B 81/28 |
| WO | WO-2012151403 | A1 | * | 11/2012 | E05B 79/06 |
| WO | 2015114154 | A2 | | 8/2015 | |
| WO | 2015144526 | | | 10/2015 | |
| WO | 2016077068 | A1 | | 5/2016 | |
| WO | WO-2017211500 | A1 | * | 12/2017 | E05B 79/06 |
| WO | 2018219268 | A1 | | 12/2018 | |

* cited by examiner

100

100

DEVICE FOR ALIGNING COVERS FOR VEHICLES

RELATED APPLICATION(S)

The present application claims the benefit of German Patent Application No. 10 2022 110 011.1, filed Apr. 26, 2022, the contents of which are hereby incorporated by reference.

BACKGROUND

Door handle assemblies are used in vehicles to open and close doors or covers arranged in body openings, in particular on the vehicle exterior. Traditionally, door handle assemblies are used in particular in vehicles in which the door handle can actuate a corresponding door lock preferably purely mechanically, for example with the aid of a Bowden cable or with the aid of other force transfer elements when the door handle is actuated. Such door handles typically extend beyond the exterior of the vehicle door in order to allow the user to grip the door handle for pulling the door open.

The aforementioned purely mechanical door handles have been increasingly replaced by electric door handles, which additionally comprise a mechanical emergency unlocking element, for example on the basis of a Bowden cable. Such electrical door handles are often not limited to the fact that the user can grasp them for a pulling action. Rather, these can be made more flexible by the electrical opening of the door lock, as only a small amount of force is then required to open the door. For this reason and for aesthetic reasons, so-called flush door handles are on the rise in newer vehicles. Flush door handles are door handles whose surface, in the resting position, lies in a plane with the outer skin of the vehicle surrounding it. Such flush door handles are already available in several design variants. The flush door handles can be subdivided into flush door handles that open outwardly and those that open inwardly.

The outwardly opening flush door handles are door handles that must be moved outwardly from the resting position into an exposed operating position prior to actuation. Accordingly, the cover of this type of flush door handles, which, in the resting position, lies flush with the surrounding body portion, is pivoted into the exposed operating position and serves as a handle for opening the door in the same time.

In the case of the inwardly opening flush door handles, a door handle recess is located behind the outer surface of the vehicle. The recess is configured so that the user can engage with the recess in order to open the door. To prevent an accumulation of dirt and water and to prevent ice in the door recess, in the case of such inwardly opening flush door handles, a cover is provided, which is arranged flush with the surrounding outer surface of the vehicle in the resting position of the door handle. To engage the door recess, this cover is then pushed or pivoted into the recess. This can be done either manually by the hand of the user or automatically, for example by an electric drive.

In the construction of actuating mechanisms for covers of flush door handles, it is in particular a challenge to design them so as to be electrically and simultaneously actuatable. The manual actuation option is necessary if there is a failure of the electrical actuator of the actuating apparatus for the cover. Further, it is often problematic to guarantee that the cover reliably and repeatably comes to lie flush with the outer surface of the vehicle in its closed position. This is made more difficult in particular in the case of inwardly opening flush door handles by the fact that dirt or ice can become deposited in the door handle recess, which can impair a movement of the cover into the closed position or out of the closed position.

SUMMARY

The present disclosure relates to apparatuses for aligning covers for vehicles, substantially as illustrated by and described in connection with at least one of the figures, as set forth more completely in the claims. More specifically, the disclosure relates to apparatuses for aligning covers for door handles, in particular flush door handles, of a vehicle. The present disclosure further relates to vehicles having such an apparatus.

According to the present disclosure, the cover is not applied directly onto the kinematics for pivoting the cover. Rather, a support assembly is provided between the kinematics and the cover, which ensures that the cover, in its closed position, closes flush with the outer skin of the vehicle. In other words, with the support assembly, the cover is reliably arranged in a plane with the outer skin of the vehicle.

According to a further development of the present disclosure, the support assembly comprises an elastic support layer. By providing an elastic support layer as portion of the support assembly, adjustment tolerances of the kinematics and the opening of the outer skin can be compensated. For example, the elastic support layer allows the cover to be displaced in relation to the kinematics even in the installed state. It is thus not absolutely necessary that the entire kinematics is perfectly matched to the opening of the outer skin. Rather, with this design, only the cover can be aligned in relation to the opening, wherein the elastic support layer compensates for possible deviations between the position of the cover and the kinematics.

According to a further aspect, the elastic support layer can have a surface that is the same size or larger than a surface of the cover. In other words, the elastic support layer according to this design variant covers the entire rear side of the cover. This results in a particularly advantageous flexibility for displacing the cover in all directions.

According to a further aspect, the cover, in its closed position, is arranged in an opening of the outer skin, and wherein the elastic support layer comprises sealing lips configured so as to seal the opening. In this aspect, the elastic support layer is not only used in order to create a tolerance compensation for the cover, but also to prevent water from penetrating into the interior of the vehicle body.

The sealing lips can extend around an outer circumference of the elastic support layer, and wherein the sealing lips extend beyond an outer circumference of the cover. Thus, the elastic support layer can be used in particular to seal the entire circumference of the opening in the outer skin of the vehicle against water and other contaminants. The sealing lips themselves can have some flexibility, so that a smaller offset of the elastic support layer and the kinematics associated therewith in relation to the opening can also be compensated by this elasticity.

According to a further aspect, the elastic support layer comprises, on a side facing away from the cover, a fastening element configured so as to be inserted into a corresponding opening of the kinematics for fastening the elastic support layer to the kinematics. Accordingly, the elastic support layer can be connected directly to the kinematics during the installation of the apparatus according to the disclosure, without needing further components. For example, the elastic support layer can simply be inserted into the kinematics with the fastening element. The elastic support layer can first be connected to the cover, whereupon the support layer is inserted into the kinematics together with the cover. This also has the advantage that the cover and/or the support layer are quickly and easily replaceable, for example if damage occurs to the cover or the sealing lips of the support layer.

According to a further aspect, the fastening element is configured such that the support assembly is movable, in particular rotatable, in two degrees of rotational freedom in relation to a first axis of rotation that is aligned perpendicular to a longitudinal axis of the fastening element and in relation to a second axis of rotation that is aligned perpendicular to the longitudinal axis of the fastening element and perpendicular to the first axis of rotation. In other words, the fastening element can function as a cardan joint due to its elasticity, which allows a rotation of the support assembly in relation to the kinematics in two degrees of freedom.

According to a further aspect, the fastening element is deformable between a normal state in which a diameter of the fastening element is greater than a diameter of the opening of the kinematics and an insertion state in which the diameter of the fastening element is smaller than the diameter of the opening of the kinematics. In other words, the fastening element can also be elastic, allowing it to be inserted into a smaller opening of the kinematics by compression. As soon as the fastening element has penetrated the opening, it will re-expand and anchor into the kinematics due to its elastic effect. Such a plug-like fastening element additionally simplifies the assembly of the apparatus according to the disclosure.

According to a further aspect, the apparatus comprises a recess connected or connectable to the outer skin of the vehicle, and wherein the elastic support layer comprises at least one lug projecting over a side edge of the elastic support layer and configured so as to engage into a corresponding indentation of the recess in the closed position of the cover. Accordingly, the recess, which is directly connected to the inside of the vehicle outer skin, can be used in order to align the elastic support layer in relation to the opening. For this purpose, the lugs of the support layer, which are configured as guide elements, penetrate into the indentations of the recess when the cover is transferred into its closed position. It follows that the elastic support layer, and thus the cover, is no longer displaceable in the plane of the outer skin when it is operatively engaged in its closed position with the indentations of the recess. It should be noted, however, that movement of the cover and the support assembly perpendicular to the plane of the outer skin, i.e., in the pivoting direction, remains possible at all times.

According to a further aspect, the elastic support layer is integrally formed. Accordingly, the support layer as well as the sealing lips and the fastening element can all be formed from the same material. This in particular simplifies the manufacture of the support layer of the support assembly described herein.

According to a further aspect, the elastic support layer comprises centering elements for centering the cover in relation to the elastic support layer. As will be explained in further detail below, for example, the centering elements can be centering projections or centering openings. The cover itself or further components can comprise with corresponding openings or centering projections, which are matched to the centering elements of the support layer. Thus, the cover can be easily and repeatably aligned in relation to the support layer. On the other hand, the cover can also be easily removed from the support layer at any time in order to replace it.

According to a further aspect, the support assembly comprises a half-shell that is releasably connected or connectable to the cover and, together with the cover, forms a cavity that is suitable for receiving a sensor apparatus. For example, the sensor apparatus can be a capacitive sensor that can detect the touching of the cover by the user. As will be explained in further detail below, this can cause the cover to automatically pivot into the open position. Consequently, the support assembly according to this aspect is not only configured so as to align the cover flush with the outer skin. Rather, it can also simultaneously serve to securely accommodate a sensor apparatus.

According to a further aspect, the half-shell comprises centering elements for centering the half-shell in relation to the elastic support layer, wherein one of the centering elements preferably extends through the elastic support layer into a portion of the kinematics. Thus, the half-shell can also be easily and repeatably aligned in relation to the elastic support layer. However, the half-shell is anchored directly to the kinematics, which has the necessary strength. Accordingly, the half-shell is securely anchored to the kinematics and still has a certain amount of play due to the elastic support layer.

According to a further aspect, the apparatus comprises a recess mounted on an inner side of the outer skin of the vehicle and comprising at least a first indentation for aligning the support assembly in relation to the recess. For example, the recess can be used in order to align the support assembly in relation to the outer skin or the openings of the outer skin. The recess itself can comprise a groove for receiving a portion of the outer skin. In particular, the outer skin can be bent inwardly for this purpose and can be received in the groove of the recess, as will be explained in further detail below. Thus, the recess is aligned exactly in relation to the outer skin at all times.

According to a further aspect, the kinematics comprises a pivot axis, wherein the recess comprises at least a second indentation for aligning the pivot axis in relation to the recess. Thus, according to this aspect, the recess can also be used in order to ensure a reliable alignment of the kinematics in relation to the opening of the outer skin.

According to a further aspect, the present disclosure relates to a door handle assembly, in particular for a flush door handle, for insertion into a body opening of a vehicle, wherein the door handle assembly comprises a cover for closing an opening on a vehicle, as well as one of the above-mentioned apparatuses for aligning the cover.

In a further aspect, the present disclosure relates to a vehicle having the aforementioned door handle assembly.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

The present disclosure addresses the problem of specifying an actuating mechanism for covers, in particular for covers of flush door handles, by which the cover can be reliably and repeatably moved into a specified (in particular flush) closed position.

The present disclosure relates to apparatuses for aligning covers, in particular covers of a door handle assembly for a vehicle, preferably for a side door of a vehicle, and in particular outer door handles, although the apparatus can also fundamentally be used in order to align covers for inner door handles or for door handles for a trunk lid. Finally, the apparatus can be used in order to align many other covers in the vehicle field, for example to align fueling, service, or charging flaps.

Accordingly, the present disclosure relates to an apparatus for aligning covers for vehicles, in particular covers for flush door handles, wherein the cover is reversibly movable, and in particular pivotable, between a closed position in which the cover covers a door handle recess and an open position in which the cover releases a door handle recess, and wherein the apparatus comprises the following: a kinematics configured so as to reversibly move, and in particular pivot, the cover between the closed position and the open position; a support assembly configured so as to connect the cover to the kinematics in such a way that the cover, in its closed position, is arranged flush with an outer skin of the vehicle.

Figure 1:
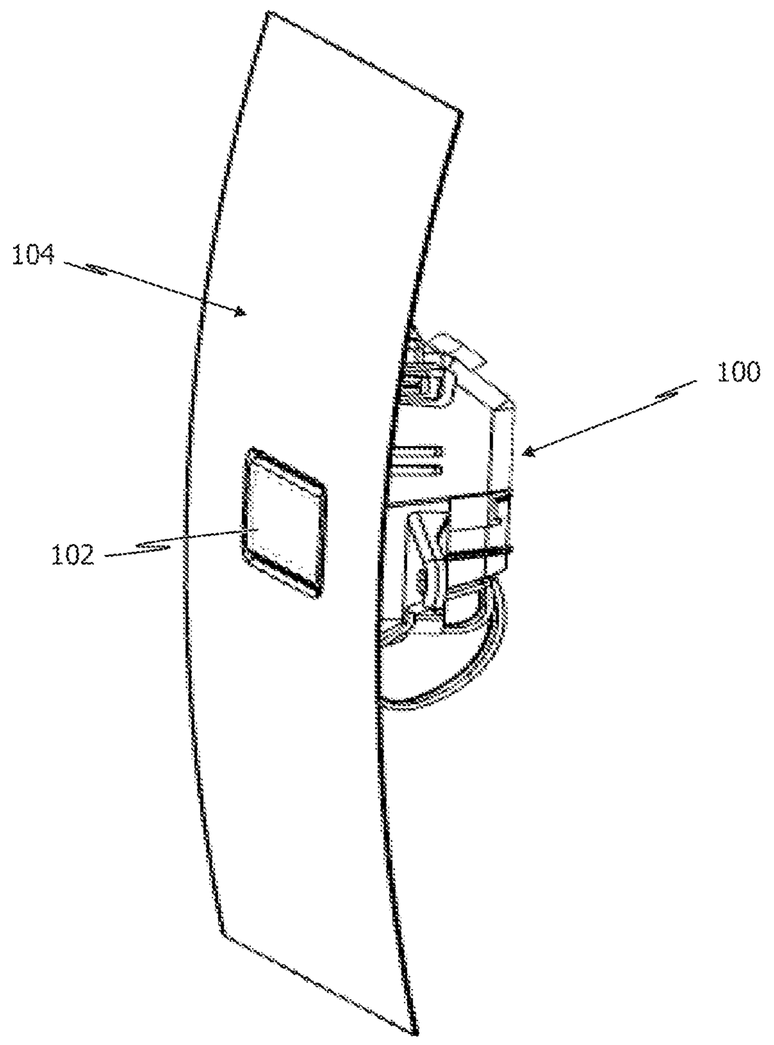
FIG. 1 a perspective view of a vehicle outer skin with an apparatus for aligning covers according to one aspect of the present disclosure.

FIG. 1 shows a perspective schematic view of an apparatus for aligning covers for vehicles according to the present disclosure. The apparatus 100 shown here is suitable for aligning covers 102 configured as door handles. In particular, the cover 102 shown as a door handle according to FIG. 1 is a cover 102 for a flush door handle. Accordingly, the cover 102 of the flush door handle lies flush with an outer skin 104 of a vehicle. In order to ensure that such an arrangement is accurate and repeatable, the apparatus 100 that will be described in further detail below is provided.

The disclosure is not limited to the illustrated apparatus for aligning door handle covers. Rather, it is also applicable to many other flush covers, such as those used for service, charging, or fueling flaps.

Figure 2A:
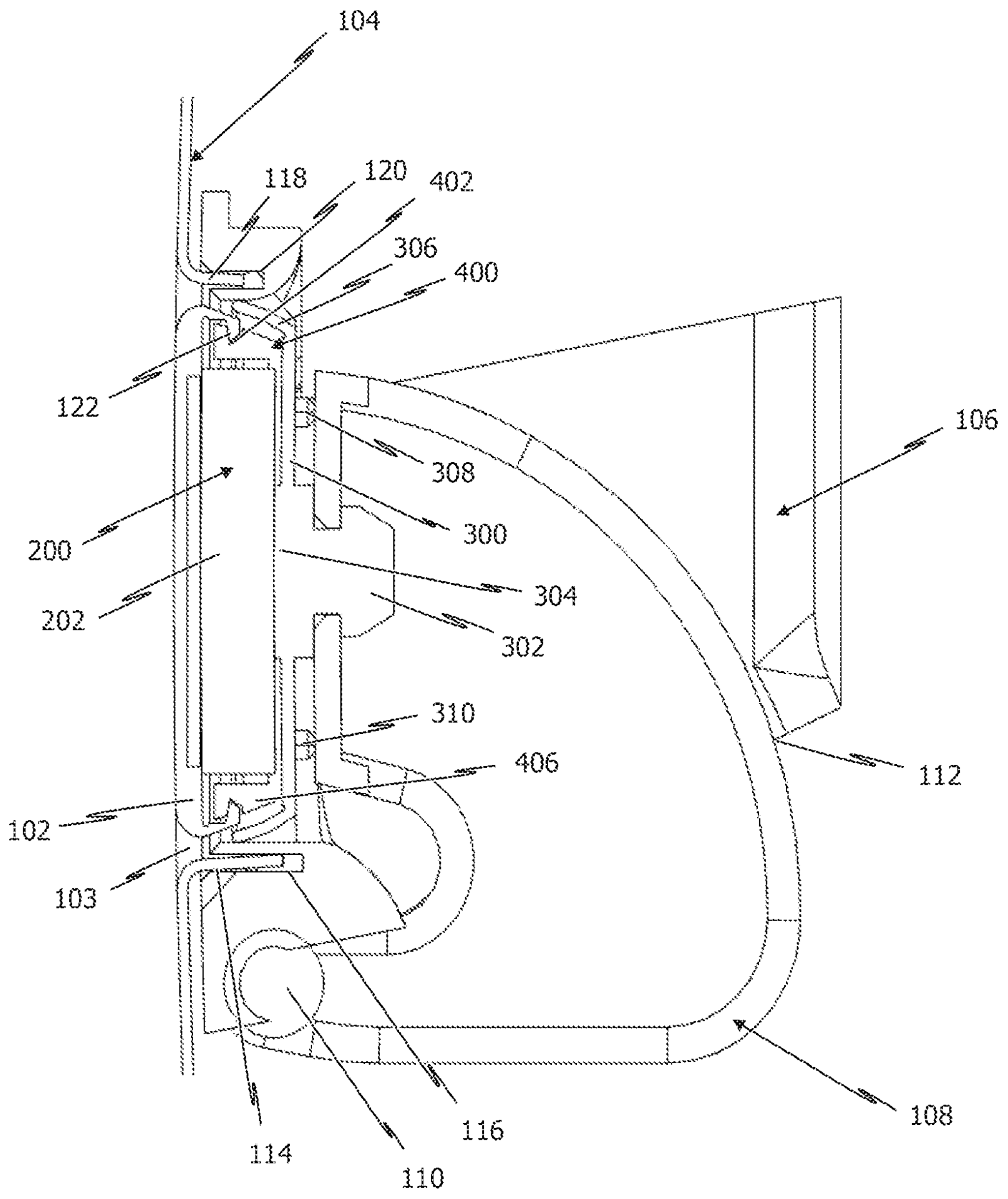
FIG. 2A a cross-section through the apparatus shown in FIG. 1 in the closed position.
Figure 2B:
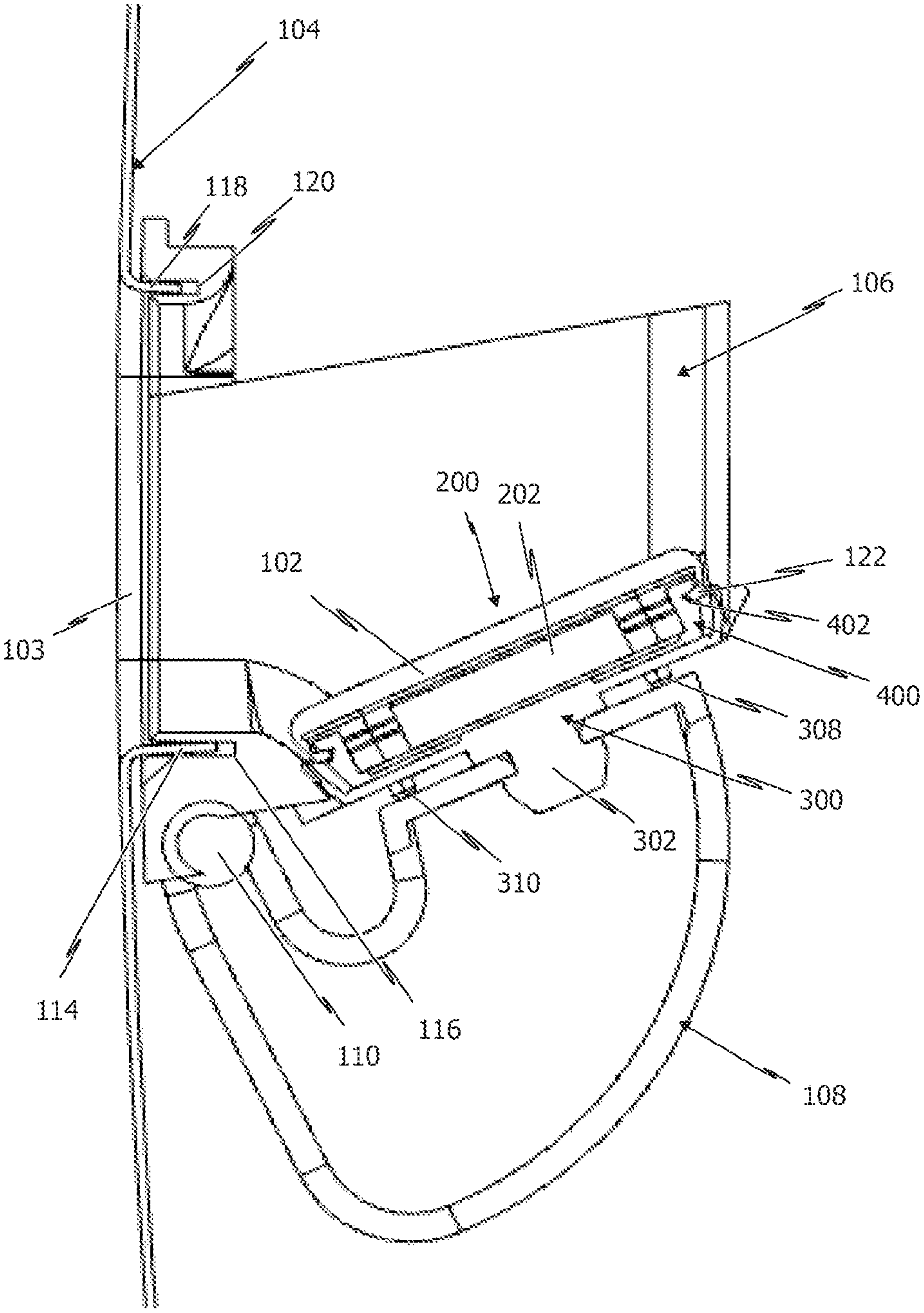
FIG. 2B a cross-section through the apparatus shown in FIG. 1A in the open position.

A cross-section through the apparatus shown in FIG. 1 can be seen in FIGS. 2A and 2B. In FIG. 2A, a cross-section through the apparatus in the closed position of the cover 102 is shown. In FIG. 2B, a cross-section through the apparatus 100 in the open position of the cover 102 is shown.

The apparatus 100 comprises a kinematics 108 configured so as to reversibly move the cover 102 between the closed position and the open position. In the example shown in the figures, the kinematics 108 is in particular configured as a pivoting apparatus and serves to pivot the cover 102 between the positions shown in FIGS. 2A and 2B. The pivoting apparatus of the kinematics 108 is pivotable in relation to a first pivot axis 110.

The apparatus 100 comprises a door handle recess 106. The door handle recess 106 can in particular be configured in a trough shaped in order to ensure an outward flow of water. The door handle recess 106 is connected to an inner side of the outer skin 104. In the example shown herein, the door handle recess 106 is in particular configured so as to receive a portion of the outer skin 104. For this purpose, the door handle recess 106 comprises grooves 116, 120, which are configured so as to receive inwardly bent portions 114, 118 of the outer skin. In particular, the grooves 116, 120 of the door handle recess 106 are pushed onto the bent portions 114, 118 of the outer skin 104. This can serve to align the door handle recess 106 in relation to the opening 103 of the outer skin 104.

The door handle recess 106 comprises an opening 112. The pivoting apparatus of the kinematics 108 extends through the opening 112 of the door handle recess 106. The opening 112 is arranged in particular at a bottom of the recess 106. When pivoting the pivoting apparatus, it is guided through the opening 112 in the door handle recess 106.

The pivot axis 110 is arranged below the door handle recess 106. However, the present disclosure is not limited to the kinematics 108 being pivoted downwardly, as exemplified in FIGS. 2A and 2B. Rather, the kinematics 108 can be moved in many different ways between the open position and the closed position.

The apparatus further comprises a support assembly 200 configured so as to connect the cover 102 to the kinematics 108 in such a way that the cover 102, in its closed position, is arranged flush with the outer skin 104 of the vehicle, as can be seen in FIG. 2A. The support assembly 200 comprises an elastic support layer 300 as well as a half-shell 400. The support layer 300 and the half-shell 400 are arranged on the rear side of the cover 102 and connect it to the kinematics 108. In particular, the elastic support layer 300 is attached to the rear side of the half-shell 400.

As will be explained in further detail below, the half-shell 400 and the elastic support layer 300 comprise elements that extend into the kinematics 108 and thus connect the cover 102 to the kinematics 108 and align it in relation the kinematics.

The elastic support layer 300 comprises a surface that is the same size or larger than a surface of the cover 102. In other words, the elastic support layer 300 preferably covers the entire rear side of the cover 102. In particular, the elastic support layer 300 comprises sealing lips 306 that extend around the full circumference of the elastic support layer 300. The sealing lips 306 serve to seal the opening 103 of the outer skin 104 against effects of weathering.

The elastic support layer 300 is connected to the kinematics 108 via a likewise elastically formed fastening element 302. For example, the elastic fastening element 302 can be seen in FIG. 3B. The elastic fastening element extends in a direction facing away from the cover along a longitudinal axis 305. FIG. 3B shows the fastening element 302 in the normal state shown in FIGS. 2A and 3B, in which the fastening element has a substantially mushroom-like shape.

The head of the fastening element shown in FIG. 3B has a wider diameter than a corresponding opening of the pivoting apparatus of the kinematics 108. To insert the elastic support layer 300 into the pivoting apparatus, the head can be compressed into an insertion state, so that it can be temporarily reduced to the size of the opening of the pivoting apparatus. This allows for easy insertion. To facilitate such an insertion and compression, the elastic fastening element 302 has a conical shape, that is to say it has a tapered outer surface 303. The tapered outer surface 303 allows the fastening element to be compressed simultaneously upon insertion into the pivoting apparatus of the kinematics 108.

The elastic fastening element 302 is further elastic in such a way that it can be bent perpendicular to its longitudinal axis 305. Such a bending capability of the fastening element 302 allows for a rotation of the support assembly and thus of the cover 102 in relation to the kinematics, in particular along a first axis of rotation that is aligned perpendicular to the longitudinal axis 305 and in relation to a second axis of rotation that is also aligned perpendicular to the longitudinal axis 305 and perpendicular to the first axis of rotation.

Figure 3A:
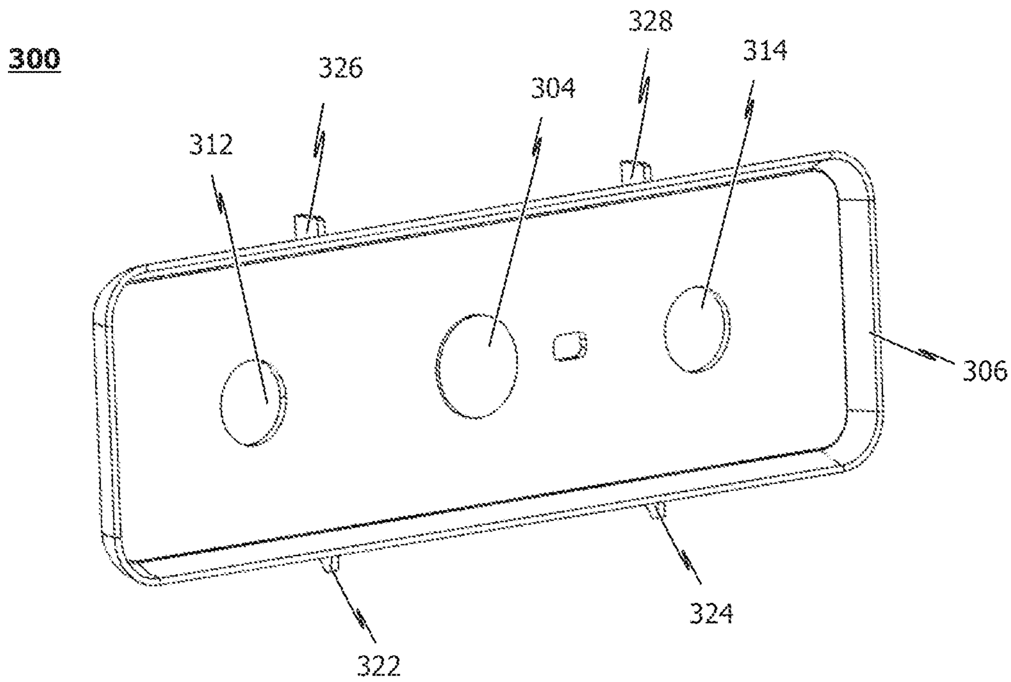
FIG. 3A a perspective front view of an elastic support layer.
Figure 3B:
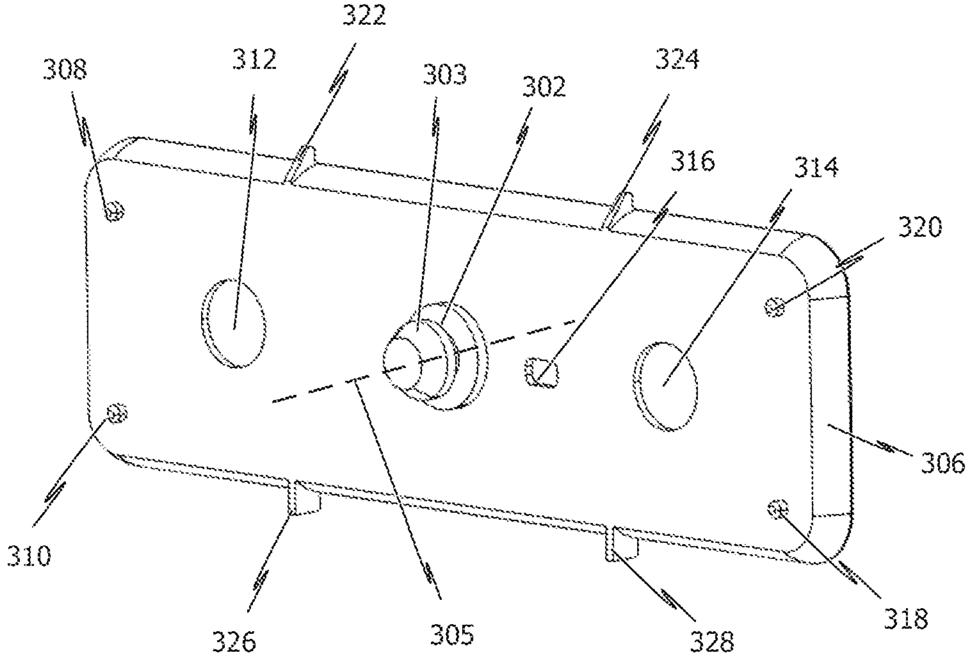
FIG. 3B a perspective rear view of the elastic support layer according to FIG. 3A.

On the front side shown in FIG. 3A, the elastic support layer 300 comprises a centering element configured as a projection 304. The centering element, in the example shown herein, is located in particular centrally on the front side of the elastic support layer 300. The projection is cylindrical in shape and extends in a direction opposite to the fastening element 302. The projection 304 serves in particular to engage into a corresponding opening 410 of the half-shell 400 in order to align the elastic support layer 300 and the half-shell 400 in relation to one another. In some examples, the support layer 300 and the half-shell are manufactured in a two-component injection molding process. The projection 304 is injected directly into the opening 410 of the half-shell 400, for example, so that a subsequent alignment of the support layer 300 in relation to the half-shell 400 is not necessary.

The aforementioned sealing lips 306 extend around an outer circumference of the elastic support layer 300. The sealing lips 306 are bent towards the front side of the elastic support layer 300. In other words, the sealing lips 306 extend in the installed state towards the outer skin 104. The elastic support layer 300 comprises feet 308, 310, 318, 320 on its rear side. One foot 308, 310, 318, 320 is respectively arranged in a corner region of the elastic support layer. For example, the first two feet 308, 310 are shown in FIG. 2A and serve to be supported on an abutment face (130, FIG. 5A) of the pivoting apparatus. The feet 308, 310, 318, 320 serve in particular to align the elastic support layer 300 planar with the abutment face of the pivoting apparatus. It is noted in particular that the elastic feet 308, 310, 318, 320 support the aforementioned rotation of the support assembly in relation to the kinematics. In particular, upon rotation of the support assembly about the first and second axis of rotation, two of the feet 308, 310, 318, 320 are respectively compressed.

The elastic support layer 300 has through-openings 312, 314 which are configured so as to receive centering elements 414, 416 of the half-shell 400, as will be explained in further detail below. A terminal opening 316 serves to receive electrical leads that are connectable to a sensor apparatus accommodated in the support assembly. The centering elements 414, 416 and the through-openings 312, 314 can be connected to one another already in the two-component injection molding process.

The elastic support layer 300 comprises four lugs 322, 324, 326, 328 that project over side edges of the elastic support layer 300. The lugs 322, 324, 326, 328 serve to align the elastic support layer 300 in relation to the door handle recess 106. The lugs 322, 324, 326, 328 are configured in particular so as to be flag-like or fin-like. The present disclosure is not limited to the number of lugs shown herein. Rather, the elastic support layer can in principle comprise any number of lugs.

Figure 4A:
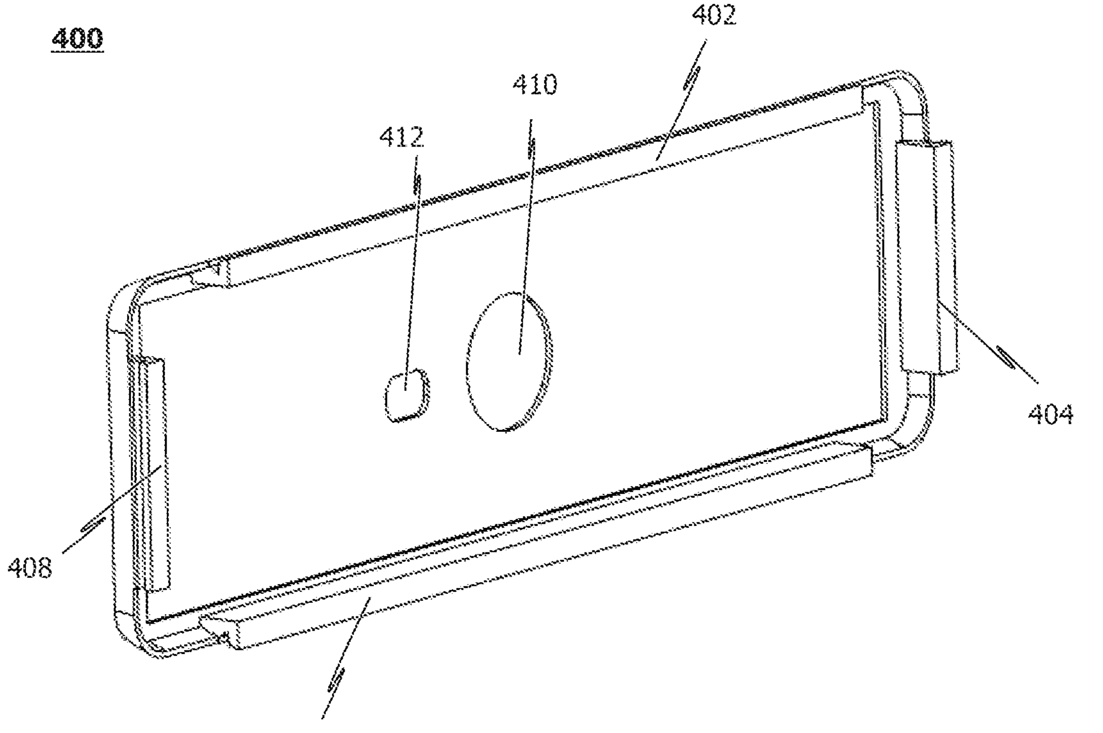
FIG. 4A a perspective front view onto a half-shell.
Figure 4B:
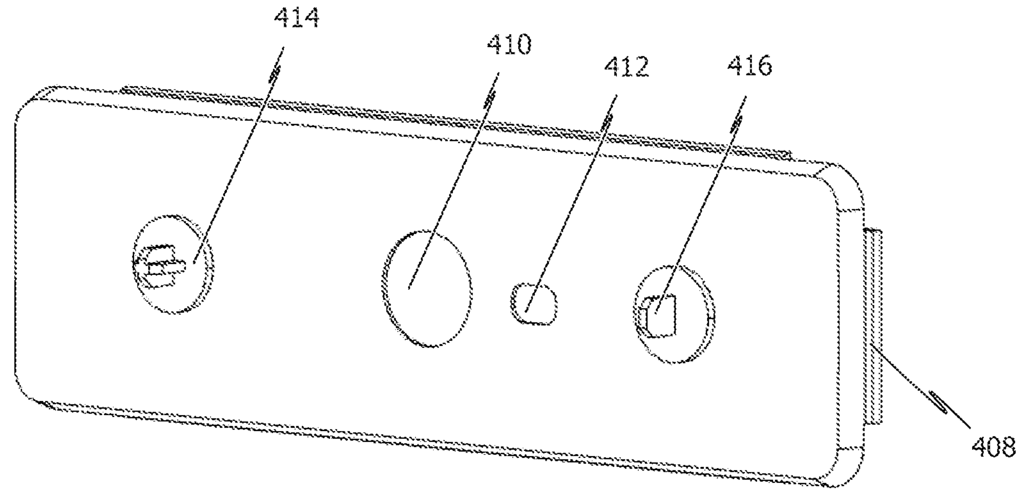
FIG. 4B a perspective rear view of the half-shell shown in FIG. 4A.

Perspective views of the half-shell 400 can be seen in FIGS. 4A and 4B. The half-shell 400 has a front side shown in FIG. 4A and a read side shown in FIG. 4B. On the front side, the half-shell 400 comprises anchoring elements 402, 404, 406, 408. The upper and lower anchoring elements 402, 406 can also be seen in the cross-section according to FIG. 2A. As shown here, the anchoring elements 402, 404, 406, 408 of the half-shell 400 are configured so as to receive an anchoring clip 122 of the cover 102. The anchoring clip 122 can extend, for example, around the circumference of the cover 102. For example, the anchoring clip 122 is flexible in such a way that it can be clipped into the anchoring elements 402, 404, 406, 408 of the half-shell 400.

It can be further seen in FIGS. 2A and 2B that the half-shell 400 and the cover 102 together form a cavity that is suitable for accommodating a sensor apparatus 202. For example, the sensor apparatus 202 can be a capacitive sensor that is designed in order to detect the touching of the cover 102 by the user. The sensor apparatus 202 can then produce a signal that is used in order to generate an electric drive for pivoting the kinematics and thus the cover 102.

It is shown in FIGS. 4A and 4B that the half-shell 400 comprises a plurality of centering elements. In particular, the half-shell 400 has a through-opening 410 that is configured so as to receive the projection 304 of the elastic support layer. Two further centering elements 414, 416 configured as projections/peaks extend at the rear side of the half-shell 400. The centering elements 414, 416 in particular have a cylindrical projection that can be received in the through-openings 312, 314 of the elastic support layer 300. The first centering element 414 further comprises a tip configured as a crosstip screwdriver, which extends beyond the cylindrical projection. The second centering apparatus 416 comprises a tip configured as a slotted screwdriver, which extends beyond the cylindrical projection. As will be explained in particular in the context of FIG. 6B, the tips are configured so as to extend through corresponding openings of the pivoting apparatus.

The half-shell 400 has a terminal opening 412 which, in the installed state of the half-shell, is arranged so as to overlap with the terminal opening 316 of the elastic support layer 300.

Figure 5A:
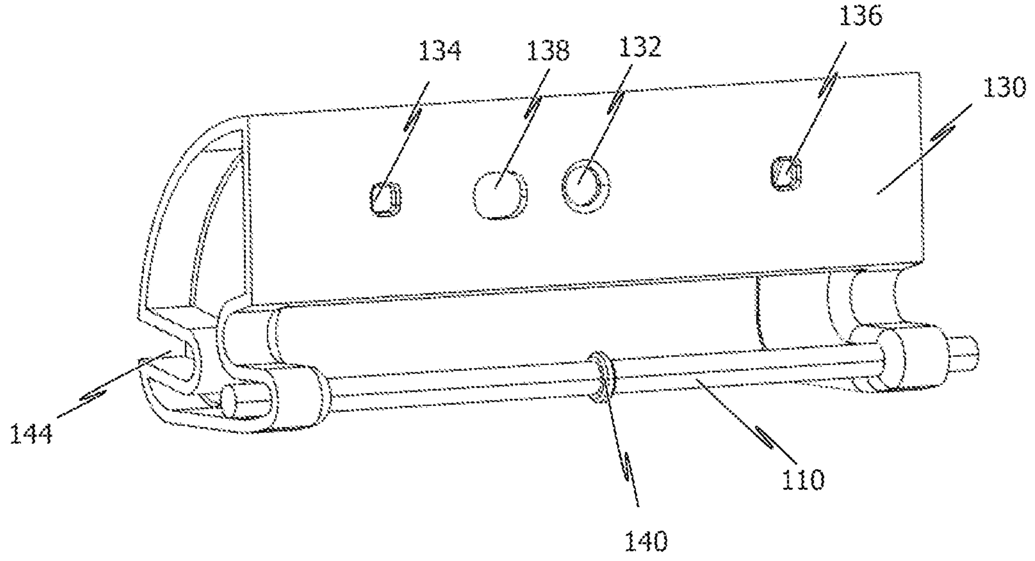
FIG. 5A a perspective front view of a pivoting apparatus.
Figure 5B:
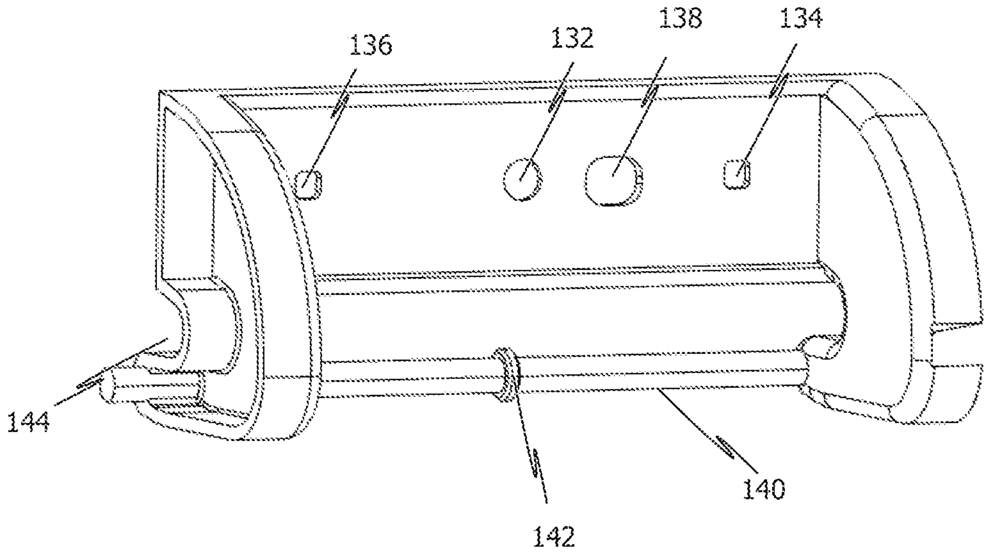
FIG. 5B a perspective rear view of the pivoting apparatus shown in FIG. 5A.

Perspective front and rear views of the pivoting apparatus of the kinematics can be seen in FIGS. 5A and 5B. The pivoting apparatus has a substantially planar abutment face 130. In the installed state, the abutment face 130 is connected to the rear side of the elastic support layer shown in FIG. 3B. Here, the feet 308, 310, 318, 320 are supported on the abutment face 130.

The pivoting apparatus comprises a fastening opening 132 configured so as to receive the elastic fastening element 302 of the elastic support layer 300. Alignment openings 134, 136 also extend through the stop face 130. The alignment openings 134, 136 serve to receive the tips 414, 416 of the half-shell.

A terminal opening 138 extends through the abutment face 130 of the pivoting apparatus. In the installed state, the terminal opening 138 is arranged so as to overlap with the respective terminal openings 316 and 412 of the elastic support layer and the half-shell. Accordingly, electrical leads from the rear side of the pivoting apparatus can be connected to the sensor apparatus 202 through the terminal openings 138, 316, 412.

The first pivot axis 110 is connected to the housing of the pivoting apparatus. The pivoting apparatus further comprises a centering element 140, which is configured as a ring extending around the pivot axis 110. For example, the centering apparatus 140 is centrally arranged on the pivot axis 110. However, it is also contemplated to provide the centering apparatus 140 at any other location on the pivot axis.

The pivoting apparatus comprises a guide groove 144. The guide groove 144 serves to guide an actuator lever (not shown) in order to transmit a torque for opening and closing the cover.

Figure 6A:
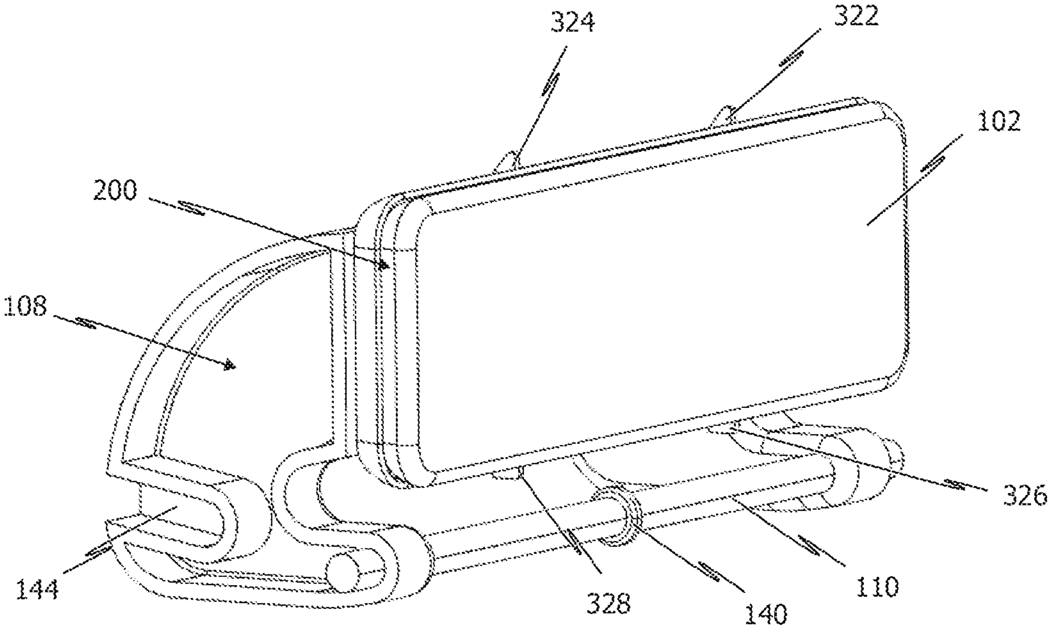
FIG. 6A a perspective front view of a kinematics with a support assembly according to the present disclosure.
Figure 6B:
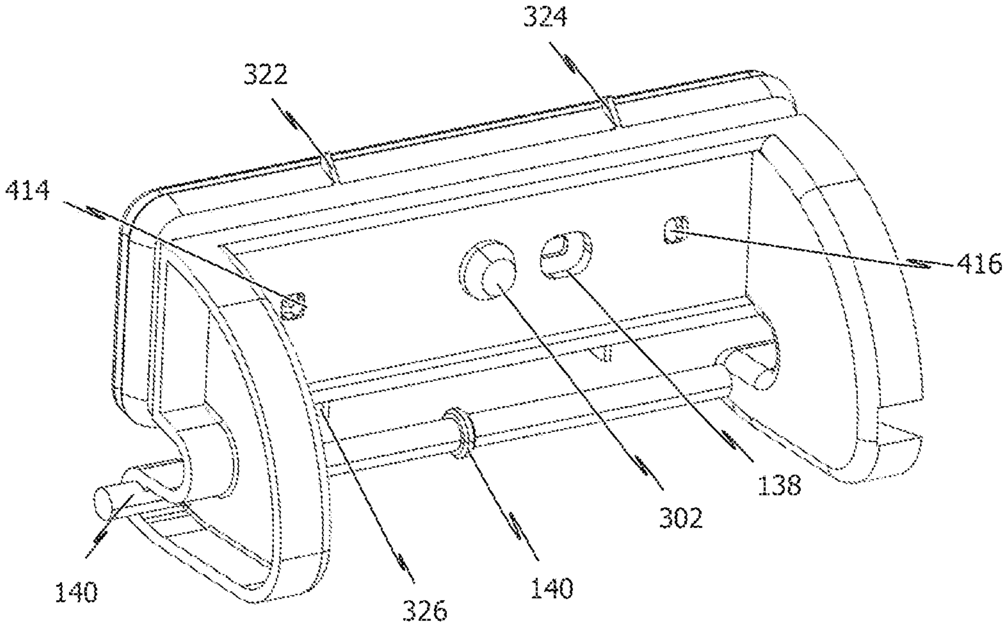
FIG. 6B a perspective rear view of the arrangement according to FIG. 6A.

FIGS. 6A and 6B show perspective views of a connection between the kinematics 108 configured as a pivoting apparatus and the cover 102 via the support assembly 200. As mentioned above, the support assembly 200 comprises in particular the elastic support layer 300 and the half-shell 400. From FIG. 6B, it can be seen that the tips 414, 416 of the half-shell 400 extend through the alignment openings 134, 136 of the pivoting apparatus. The tips prevent a twisting of the half-shell, the elastic support layer, and the pivoting apparatus in relation to one another.

With regard to FIG. 6B, it should also be noted that the lugs 322, 324, 326, 328 of the elastic support layer 300 extend beyond an outer circumference of the cover 102. Finally, the first fastening element 302 is also shown in the installed state.

Figure 7A:
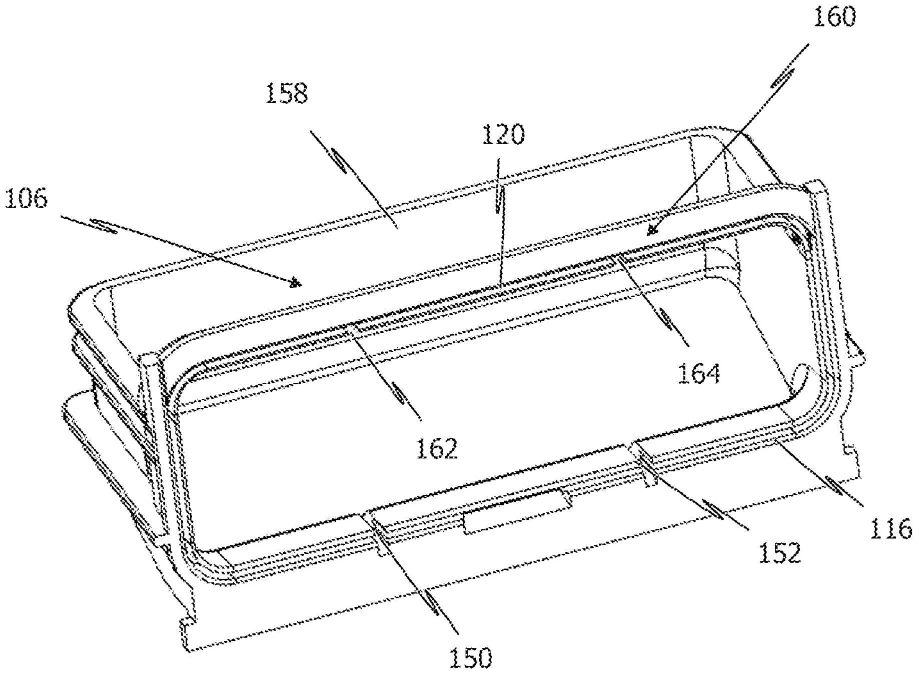
FIG. 7A a perspective front view of a door handle recess.
Figure 7B:
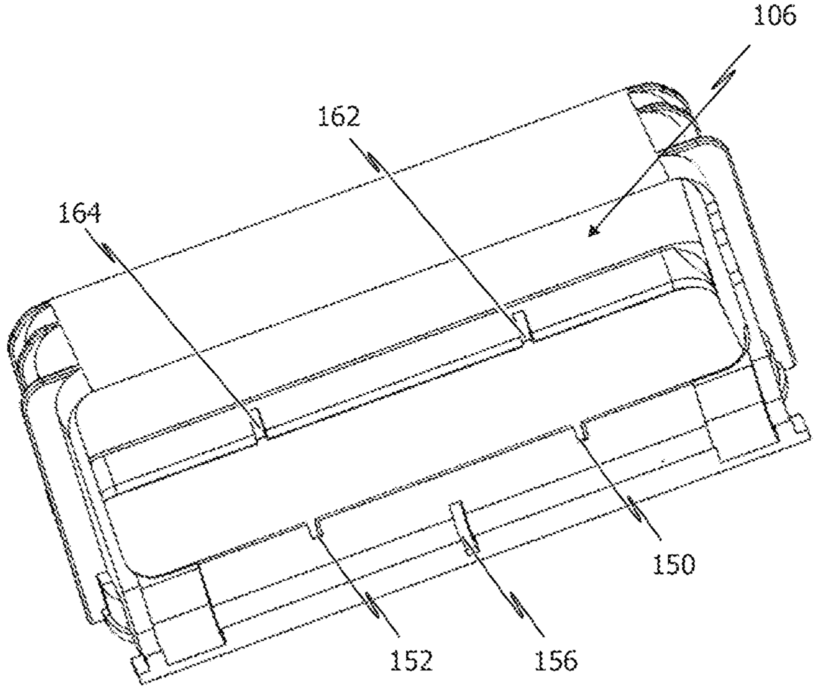
FIG. 7B a perspective bottom view of the door handle recess shown in FIG. 7A.

Perspective views of the door handle recess 106 can be seen in FIGS. 7A and 7B. The door handle recess 106 shown herein is configured in particular in two pieces. The door handle recess comprises a base body 158 and a seal 160. The seal is releasably connected to the base body 158. The base body 158 and the seal 160 comprise a respective groove 116, 120, which serves to receive an arcuate portion of the outer skin, as has already been explained with regard to FIG. 2A. Together, the grooves 116, 120 thus form a shape that corresponds to the opening shape of the outer skin. In the example shown herein, this shape is in particular rectangular.

The door handle recess 106 comprises indentations 150, 152, 162, 164 configured so as to receive the lugs 322, 324, 326, 328 of the elastic support layer 300. The indentations 150, 152, 162, 164 are in particular configured as slots, so that the fin-like or flag-like lugs 322, 324, 326, 328 of the elastic support layer can be moved into the indentations 150, 152, 162, 164 upon closing of the cover and out of the indentations 150, 152, 162, 164 upon opening of the cover 102. In the example shown herein, two indentations 150, 152 are arranged in the base body 158 and two indentations 162, 164 are arranged in the sealing element 160. However, it is obvious that the number and arrangement of the indentations are always matched to the number and arrangement of the lugs of the elastic support layer. Because the door handle recess 106 is exactly aligned in relation to the vehicle outer skin, an accommodation of the lugs 322, 324, 326, 328 also serves to align the elastic support layer 300 and thus the support assembly in relation to the vehicle outer skin. In alternative examples, the rear side of the vehicle outer shell can be equipped with indentations that serve to receive the lugs 322, 324, 326, 328. Thus, the elastic support layer 300 can also be aligned directly in relation to the vehicle outer skin.

FIG. 7B further shows an indentation 156 on the door handle recess 106, wherein the indentation 156 serves to receive the centering element 140 of the pivoting apparatus configured as a ring. As a result, the pivoting apparatus can be centered toward the pivot axis in relation to the door handle recess 106.

Figure 8:
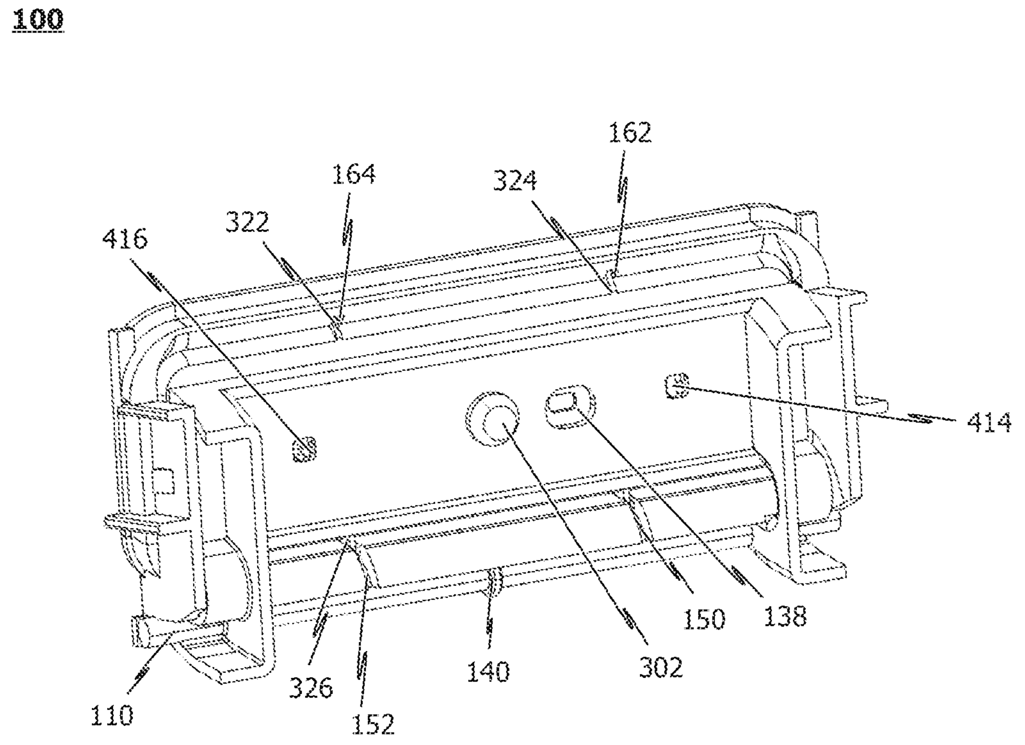
FIG. 8 a perspective rear view of the apparatus shown in FIG. 1.

FIG. 8 is a perspective rear view of the apparatus in the closed position of the cover. In addition to the illustrations already described, it is shown in particular in FIG. 8 that the lugs 322, 324, 326, 328 of the elastic support layer are accommodated in the indentations 150, 152, 162, 164 of the support assembly 106.

The disclosure is not limited to the examples shown in the drawings, but results when all of the features disclosed herein are considered together. In particular, the apparatus of the present disclosure is not limited to the described application for flush door handles. Rather, the apparatus is also suitable for other covers, such as fueling, charging, or servicing flaps of vehicles.

What is claimed is:

1. An apparatus for aligning a cover for vehicles, wherein the cover is reversibly movable between a closed position in which the cover covers a door handle recess and an open position in which the cover reveals the door handle recess, the apparatus comprising:
- a kinematics configured to reversibly move the cover between the closed position and the open position; and
- a support assembly configured to connect the cover to the kinematics in such a way that the cover, in its closed position, is arranged flush with an opening formed in an outer skin of the vehicle to cover substantially all of the opening, wherein the kinematics is further configured to rotate through a second opening in the door handle recess.

2. The apparatus according to claim 1,
wherein the support assembly comprises an elastic support layer.

3. The apparatus according to claim 2,
wherein the cover, in its closed position, is arranged in an opening of the outer skin, and wherein the elastic support layer comprises sealing lips configured to seal the opening.

4. The apparatus according to claim 3,
wherein the sealing lips extend around an outer circumference of the elastic support layer, and wherein the sealing lips extend beyond an outer circumference of the cover.

5. The apparatus according to claim 2,
wherein the elastic support layer is integrally formed.

6. The apparatus according to claim 2,
wherein the elastic support layer comprises centering elements for centering the cover in relation to the elastic support layer.

7. The apparatus according to claim 6,
wherein the centering elements comprise at least one centering projection and at least one centering opening.

8. The apparatus according to claim 2, wherein the elastic support layer covers an entire rear side of the cover.

9. The apparatus according to claim 1,
wherein the support assembly comprises a half-shell that is releasably connected or connectable to the cover and, together with the cover, forms a cavity that is suitable for receiving a sensor apparatus.

10. The apparatus according to claim 9, wherein the half-shell comprises centering elements for centering the half-shell in relation to an elastic support layer, and wherein at least one of the centering elements extends through the elastic support layer into a portion of the kinematics.

11. A door handle assembly for insertion into a body opening of a vehicle, wherein the door handle assembly comprises a cover for closing an opening on a vehicle and an apparatus according to claim 1.

12. A vehicle having a door handle assembly according to claim 11.

13. The apparatus according to claim 1, wherein the kinematics is configured to pivot the cover between the closed position and the open position.

14. An apparatus for aligning a cover for vehicles, wherein the cover is reversibly movable between a closed position in which the cover covers a door handle recess and an open position in which the cover reveals the door handle recess, the apparatus comprising:

a kinematics configured to reversibly move the cover between the closed position and the open position; and a support assembly having an elastic support layer, the support assembly configured to connect the cover to the kinematics in such a way that the cover, in its closed position, is arranged flush with an outer skin of the vehicle, wherein the elastic support layer comprises, on a side facing away from the cover, a fastening element configured to be inserted into a corresponding opening of the kinematics for fastening the elastic support layer to the kinematics, wherein the fastening element is deformable between a normal state in which a diameter of the fastening element is greater than a diameter of the opening of the kinematics and an insertion state in which the diameter of the fastening element is smaller than the diameter of the opening of the kinematics.

15. The apparatus according to claim 14, wherein the fastening element is configured such that the support assembly is movable in two degrees of rotational freedom in relation to a first axis of rotation that is aligned perpendicular to a longitudinal axis of the fastening element and in relation to a second axis of rotation that is aligned perpendicular to the longitudinal axis of the fastening element and perpendicular to the first axis of rotation.

16. The apparatus according to claim 15, wherein the support assembly is configured to rotate in two directions in relation to the first axis of rotation.

17. The apparatus according to claim 14, wherein the cover, in its closed position, is arranged in an opening of the outer skin, and wherein the elastic support layer comprises sealing lips configured to seal the opening.

18. The apparatus according to claim 17, wherein the sealing lips extend around an outer circumference of the elastic support layer, and wherein the sealing lips extend beyond an outer circumference of the cover.

19. An apparatus for aligning a cover for vehicles, wherein the cover is reversibly movable between a closed position in which the cover covers a door handle recess and an open position in which the cover reveals the door handle recess, the apparatus comprising:

a kinematics configured to reversibly move the cover between the closed position and the open position; and a support assembly having an elastic support layer, the support assembly configured to connect the cover to the kinematics in such a way that the cover, in its closed position, is arranged flush with an outer skin of the vehicle, wherein the elastic support layer comprises, on a side facing away from the cover, a fastening element configured to be inserted into a corresponding opening of the kinematics for fastening the elastic support layer to the kinematics, wherein the fastening element is configured to bend such that the support assembly is movable in two degrees of rotational freedom in relation to a first axis of rotation that is aligned perpendicular to a longitudinal axis of the fastening element and in relation to a second axis of rotation that is aligned perpendicular to the longitudinal axis of the fastening element and perpendicular to the first axis of rotation.

* * * * *